Figure 1:
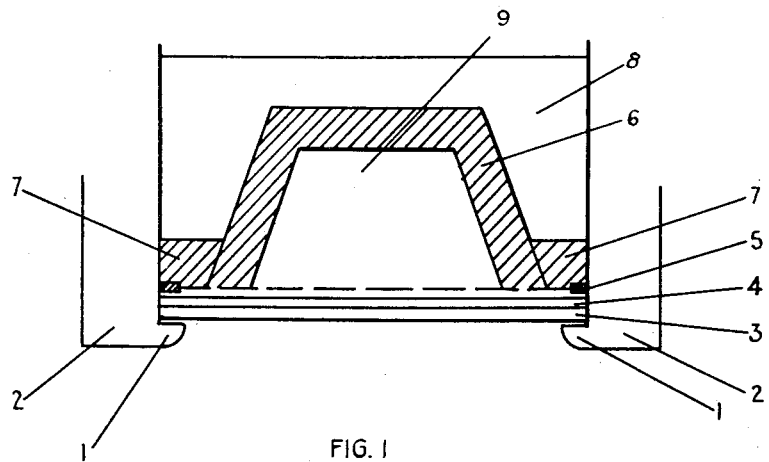

Jan. 22, 1963  W. STANLEY  3,074,104
SPINNING APPARATUS
Filed May 21, 1958

INVENTOR
WILLIAM STANLEY

BY Cushman, Darby & Cushman
ATTORNEYS

United States Patent Office 3,074,104
Patented Jan. 22, 1963

3,074,104
SPINNING APPARATUS
William Stanley, Harrogate, England, assignor to Imperial Chemical Industries Limited, London, England, a corporation of Great Britain
Filed May 21, 1958, Ser. No. 736,730
Claims priority, application Great Britain May 24, 1957
6 Claims. (Cl. 18—8)

This invention relates to an improved melt spinning apparatus.

In the melt spinning of fibres it is usual to filter the molten polymer before extrusion by forcing it through a filter bed of inert granular material, such as graded sand supported by a gauze, before it reaches the spinneret. It is frequently found advantageous to arrange the filter bed in two or more separate layers of differing degrees of fineness, the coarser materials being uppermost so that the melt passes through successive layers of increasing filtering power.

It is found that the solid material filtered from the polymer collects mainly at the interfaces between the separate layers, and this collection of solid material causes a rise in the pressure necessary to force the melt through the whole filter bed.

This effect can be reduced by increasing the areas of the flat interfacial layers, but this presents a difficulty in that the available areas are usually limited by considerations of proximity of adjacent melt spinning units and temperature uniformity requirements. With loose granular fillings it is not possible to increase the areas by using interfaces differing substantially from flat owing to the free flowing nature of the granular material.

I have now found that this difficulty can be overcome by preforming the separate inert granular components of the filter bed in moulds by means of a binding agent. In this way blocks of granular materials of almost any desired shape can be obtained without increasing the overall dimensions of the filter bed.

According to my invention I provide a filter bed for use in a melt spinning apparatus wherein molten thermoplastic polymer passes through a filter bed of graded inert granular material, characterised by the fact that at least some of the finest inert granular material comprising the filter bed is moulded into a shape or shapes so that the total filtering surface of the finest inert granular material is greater than the flat surface of the filter bed, said moulded inert granular material being held together by a binding agent, which binding agent is removed before, or during the initial stages of the melt spinning operation.

The moulded shapes made according to my invention are preferably hollow and may comprise for example, a hollow frustrum of a cone, a hollow hemisphere or cylinder or a rectangular thick walled box. When preparing these novel filter beds to obtain an increased filtering surface within the confines of a standard size filter bed the hollow portion of the moulded shape is preferably filled with a core of inert coarse granular material, preferably also moulded into shape, and the moulded shape and core are placed on a stainless steel gauze above the spinneret so that the moulded shape and core rest on the gauze. The remaining space is then covered with the fine inert granular material to a depth equal to the thickness of the moulded shape and the whole filter bed completed by covering the finer granular material with the coarser granular material. In this way the polymer always passes to the spinneret through the same thickness of fine inert granular filtering material. In one form of my invention more than one hollow moulded shape is placed on the gauze, the hollow portions are filled with the coarser inert material and the remaining space filled with the finer material to a depth equal to the thickness of the moulded shapes with a covering of coarser inert granular material.

Filter packs for use in melt spinning are pre-heated before being put into a melt spinning machine, to prevent the molten polymer being cooled and possibly solidified in the filter pack when melt spinning is started.

Silica sand is a very satisfactory inert granular material for use in my filter beds. It is relatively cheap, is inert, and, does not tend to matt down and stop the openings in the steel gauze. Other types of sand may be used. Finely divided iron filings, stainless steel filings, and similar inert metallic substances are also suitable.

In one form of my invention the binding agent is a small quantity of a low melting solid, for example, ethylene carbonate. Such a binding agent enables the inert granular filtration material to be moulded with the binding agent into any desired shape and the binding agent can be easily removed by evaporation when the filter bed is heated prior to being put into the melt spinning unit. In this way the molten polymer stream as it passes through the filter bed during spinning is not contaminated by the binding agent.

In another form of my invention the binding agent is water and the shaped filter bed is obtained by freezing a mixture of water and inert granular material in a mould. Again the binding agent can easily be removed by evaporation during the heating of the filter pack prior to spinning.

It is possible to use as a binding agent, material that is soluble in the molten polymer and solid at room temperature, for example the polymer itself. Such materials, however, have the disadvantage that the initial extrusion of molten polymer will be contaminated by the binding agent. In addition said binding agent may also have suffered thermal degradation whilst being heated in the pack before the start of extrusion and this heating could give rise to carbonaceous impurities being deposited within the pack.

A graded sand filter comprising, for example, four layers of sand of increasing fineness may be prepared by forming each grade of sand into such a shape that it may be fitted into the shape of the next coarser grade and over the shape of the next finer grade. In this way a moulded filter bed in which the filtering capacity increases from the top of the pack will be formed.

The attached drawings illustrate but do not limit my invention.

Figure 2:
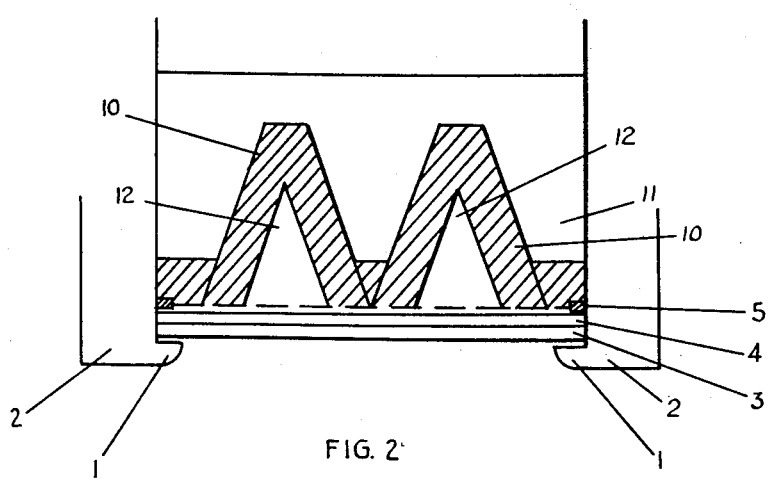

FIG. 1 is a section of a melt spinning pack incorporating a moulded sand filter and FIG. 2 is a sectional view of an alternative arrangement of my invention.

The lip 1 of a pack body 2 supports a spinneret 3, a distributor plate 4 and a stainless steel gauze 5. A moulded shape of fine sand 6 in the form of a hollow frustrum of a cone sits on the gauze 5. The space above the gauze 5 between the filter bed 6 and the inside wall of the pack body 2 is filled with loose fine sand 7 to a depth equal to that of the wall thickness of the moulded shape 6. The moulded shape 6 and loose sand 7 are covered with coarser sand 8 and the volume beneath the moulded shapes 6 is filled by a core of moulded coarse sand 9.

The interfacial area between the fine sand 6 and 7 and the coarser sand 8 is thus considerably greater than the flat area of the filter bed. Another arrangement is shown in FIG. 2 where a number of smaller moulded shapes 10 of fine graded sand replace the single moulded shape 6 of FIG. 1. A further increase in area may be obtained if the outer surfaces of the moulded shapes 6 are provided with corrugations.

In the following example which illustrates but does not limit my invention, the grades of sand are referred to by two numbers, the first of which denotes size of mesh screen through which the sand has been passed and the other number refers to the size of screen on which the sand has been retained. The mesh screens in all cases being made to British standard specification 410/1943. Thus "60/80 sand" means that the sand will pass through a 60 mesh screen but will be retained on an 80 mesh screen.

Filaments of polyethylene terephthalate were melt spun under identical temperature and throughput conditions through two filter beds contained in the same melt spinning head.

One filter bed contained a filling of a 5/16" deep layer of 60/80 sand topped with a ½" deep layer of 20/40 sand, both layers being flat and level. The other pack contained seven identical moulded shapes of 60/80 sand (of type illustrated in FIG. 2), moulded with a binding agent of ethylene carbonate. The moulded shapes had a wall thickness of 5/16" and were surrounded by a 5/16" layer of 60/80 sand and were filled with a moulded supporting core of 10/20 sand. The remaining spaces up to the top of the moulded shapes were filled with 10/20 sand and a ½" layer of 20/40 was laid over the moulded shapes. The 10/20 sand in both instances serving only to support the other layers as the flow resistances of such coarse sand is negligible.

The surface area of 60/80 sand in the first pack was 8.9 sq. ins. and in the second pack 17.8 sq. ins.

Molten polyethylene terephthalate polymer with a high titanox content was spun through each pack at a rate of 5 lb./hr.

The initial spinning pressures for the two filter beds were 2100 p.s.i.g. and 1600 p.s.i.g. respectively. Extrusion was continued through each bed until a back pressure of 6500 p.s.i.g. was achieved. The first pack reached this pressure in 17 hrs. and the other pack in 37 hrs.

The filter bed of my invention is suitable for use in any melt spinning process for the production of shaped articles such as fibres, films and the like from molten thermoplastic polymers, and in particular for the production of shaped articles of polyethylene terephthalate.

What I claim is:

1. In a melt spinning apparatus, a bed for filtering molten thermoplastic polymer passed longitudinally therethrough, said bed comprising: two adjacent contacting layers of graded granular material disposed transversely to the flow of polymer; one of said layers including at least one molded shape having a surface of irregular configuration, portions of which extend out of the transverse plane defined by the remainder of said one layer; said surface being in contact with the other layer and thereby defining therewith an irregular interface of substantially greater area than an interface formed by layers having their contacting surfaces lying in a single plane; the granular material of said shape being held together by a binding agent which is readily removable before melt spinning.

2. A filter bed as set forth in claim 1 in which said shaped layer has a hollow portion.

3. A filter bed as set forth in claim 2 in which one of said layers is within said hollow portion and is of coarse inert granular material.

4. A filter bed as set forth in claim 3 in which said layer of coarse granular material is shaped to fit against the wall of the hollow portion of said shaped layer.

5. A filter bed as set forth in claim 1 in which the inert granular material is sand.

6. A filter bed as set forth in claim 1 in which the binding agent is a low melting solid.

References Cited in the file of this patent

UNITED STATES PATENTS

| | | |
|---|---|---|
| 521,591 | Lynn | June 19, 1894 |
| 664,782 | Rittenhausen | Dec. 25, 1900 |
| 1,276,271 | Rossignol | Aug. 20, 1918 |
| 1,629,269 | Hagg | May 17, 1927 |
| 1,954,236 | Benjamin | Apr. 10, 1934 |
| 1,988,478 | Broadwell | Jan. 22, 1935 |
| 1,993,816 | Wills | Mar. 12, 1935 |
| 2,053,159 | Miller | Sept. 1, 1936 |
| 2,136,404 | Wheeler | Nov. 15, 1938 |
| 2,266,363 | Graves | Dec. 16, 1941 |
| 2,266,368 | Hull | Dec. 16, 1941 |
| 2,358,211 | Christensen | Sept. 12, 1944 |
| 2,463,825 | Strassheim | Mar. 8, 1949 |
| 2,661,845 | Sullivan | Dec. 8, 1953 |
| 2,765,512 | Nesbit | Oct. 9, 1956 |

FOREIGN PATENTS

| | | |
|---|---|---|
| 2,472 | Great Britain | Feb. 19, 1886 |